United States Patent
Hensley et al.

[19]

[11] Patent Number: 6,042,417
[45] Date of Patent: Mar. 28, 2000

[54] POWER FEED ADAPTER

[75] Inventors: Frederick M. Hensley; L. C. Derek Chamberlain, both of Colorado Springs, Colo.

[73] Assignee: Schlage Lock Company, San Francisco, Calif.

[21] Appl. No.: 09/111,142

[22] Filed: Jul. 7, 1998

Related U.S. Application Data

[60] Provisional application No. 60/053,748, Jul. 25, 1997.

[51] Int. Cl.[7] ........................................ H01R 3/00
[52] U.S. Cl. .......................... 439/500; 439/500; 439/627
[58] Field of Search .................................. 439/500, 627; 429/96, 99, 170; 320/107

[56] References Cited

U.S. PATENT DOCUMENTS

| | | | |
|---|---|---|---|
| 4,229,686 | 10/1980 | Mullersman et al. | 320/113 |
| 4,232,260 | 11/1980 | Lambkin | 320/110 |
| 4,495,257 | 1/1985 | Engelstein et al. | 429/100 |
| 4,991,069 | 2/1991 | Tiller | 362/183 |
| 5,079,108 | 1/1992 | Annen et al. | 429/171 |
| 5,091,771 | 2/1992 | Bolan et al. | 357/74 |
| 5,211,579 | 5/1993 | Seong et al. | 439/500 |
| 5,254,927 | 10/1993 | Chaing | 320/107 |
| 5,395,263 | 3/1995 | Sandell | 439/500 |
| 5,399,061 | 3/1995 | Grumblatt | 414/812 |
| 5,431,575 | 7/1995 | Engira | 439/218 |
| 5,457,376 | 10/1995 | Chong et al. | 320/107 |
| 5,537,022 | 7/1996 | Huang | 320/107 |
| 5,631,098 | 5/1997 | Suzuki | 429/96 |
| 5,749,253 | 5/1998 | Glick et al. | 70/278 |

OTHER PUBLICATIONS

Dallas Semiconductor, Technical Data Sheet, Serial No. iButton DS1990A, Copyright 1995.

*Primary Examiner*—Paula Bradley
*Assistant Examiner*—Truc Nguyen
*Attorney, Agent, or Firm*—Michael H. Minns

[57] ABSTRACT

A power feed adapter comprising: a battery holder; an adapter cap for attachment to the battery holder, the adapter cap having an electrical contact thereon, the electrical contact comprising: a central contact connected to a positive terminal of the battery holder; an insulating ring surrounding the central contact; and a ground ring surrounding the insulating ring, the ground ring being connected to a negative terminal of the battery holder.

9 Claims, 4 Drawing Sheets

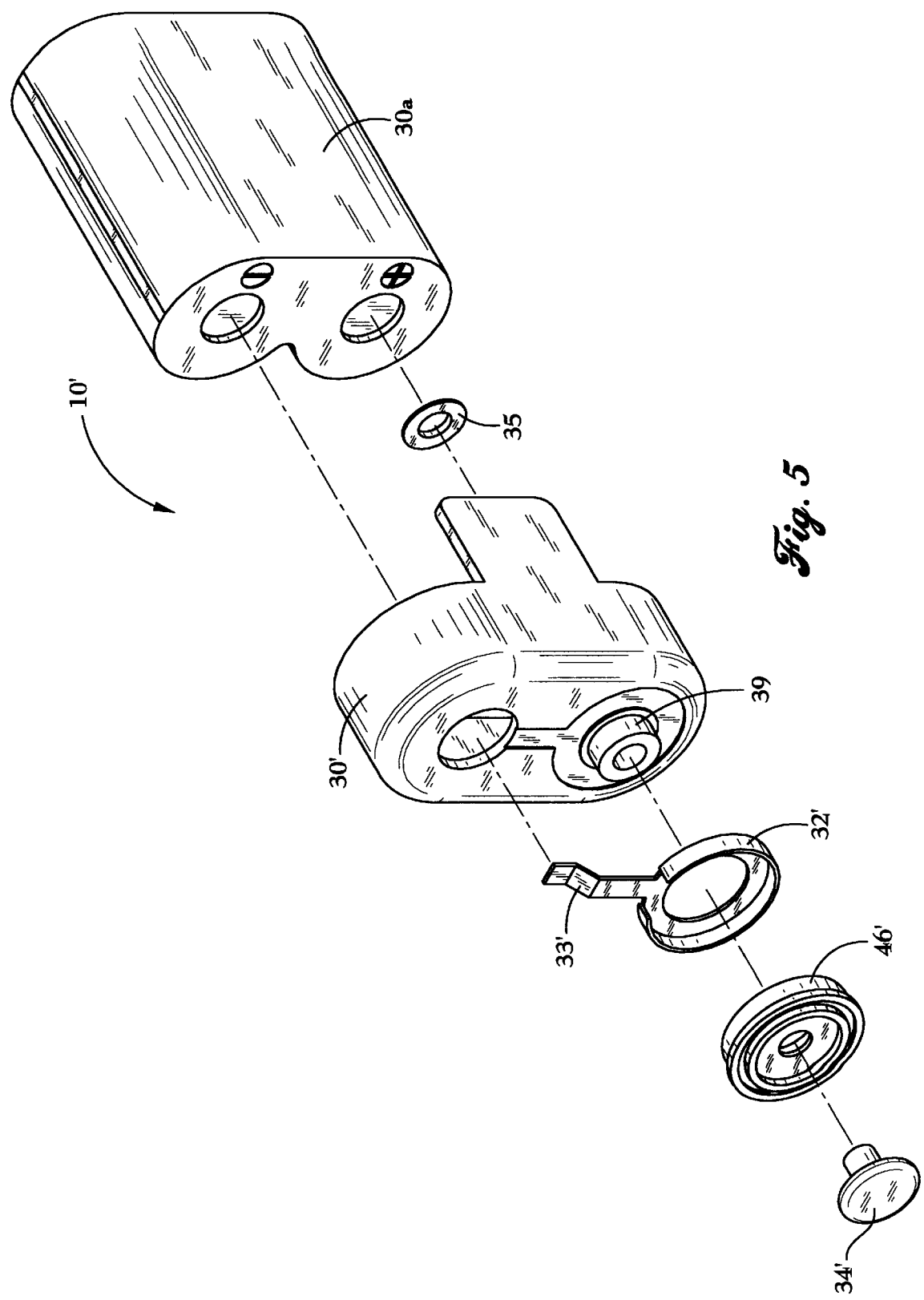

POWER FEED ADAPTER

This application claims the benefit under 35 U.S.C. § 119(e) of U.S. provisional patent application No. 60/053,748, filed Jul. 25, 1997.

BACKGROUND OF THE INVENTION

This invention relates generally to power feed adapters and more particularly to power feed adapters for electronic locks.

In the event of total depletion of the on-board battery of an electronic lock, it is preferred that the electronics have the capability of receiving power from an external power source to allow the electronic lock to operate for at least one unlocking cycle. This would allow the door to be unlocked and the on-board battery to be replaced.

In some prior art electronic locks, this has been accomplished by attaching wires to a battery and touching the wires to the electronic lock. One problem with this method is assuring the proper polarity of the connection. Reversed polarity can irreparably damage the electronic lock.

The foregoing illustrates limitations known to exist in present power feed adapters. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a power feed adapter comprising: a battery holder; an adapter cap for attachment to the battery holder, the adapter cap having an electrical contact thereon, the electrical contact comprising: a central contact connected to a positive terminal of the battery holder; an insulating ring surrounding the central contact; and a ground ring surrounding the insulating ring, the ground ring being connected to a negative terminal of the battery holder.

The foregoing and other aspects will become apparent from the following detailed description of the invention when considered in conjunction with the accompanying drawing figures.

BRIEF DESCRIPTION OF THE DRAWING FIGURES

FIG. 5 is an exploded perspective of a second embodiment of the power feed adapter of the present invention.

DETAILED DESCRIPTION

Figure 4:
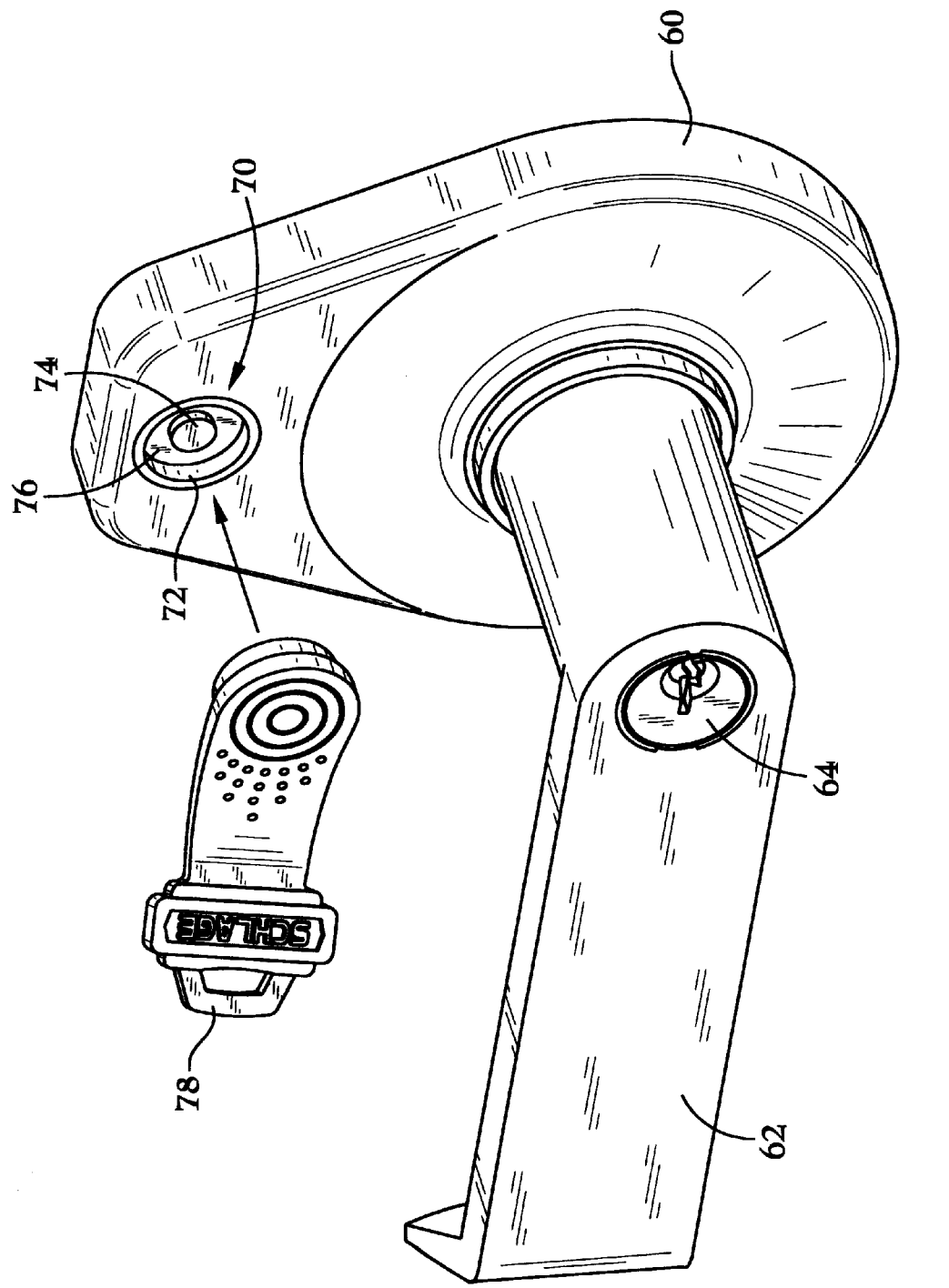
FIG. 4 is a perspective view of an electromechanical lock illustrating a typical contact target.

FIG. 4 shows an electronic or electromechanical lock adapted to use an electronic target 70 that is for use with an electronic key 78, such as a Dallas Semiconductor iButton® access control electronic key. The lock shown in FIG. 4 includes a lever 62 with a mechanical cylinder 64. The electronic target 70 is mounted in the escutcheon 60. The electronic target 70 comprises a central contact 74 surrounded by an insulating ring 76. Surrounding the insulating ring 76 is a ground ring 72. Typically, the central contact 74 is a positive voltage contact and the ground ring 72 is a negative voltage contact.

Figure 1:
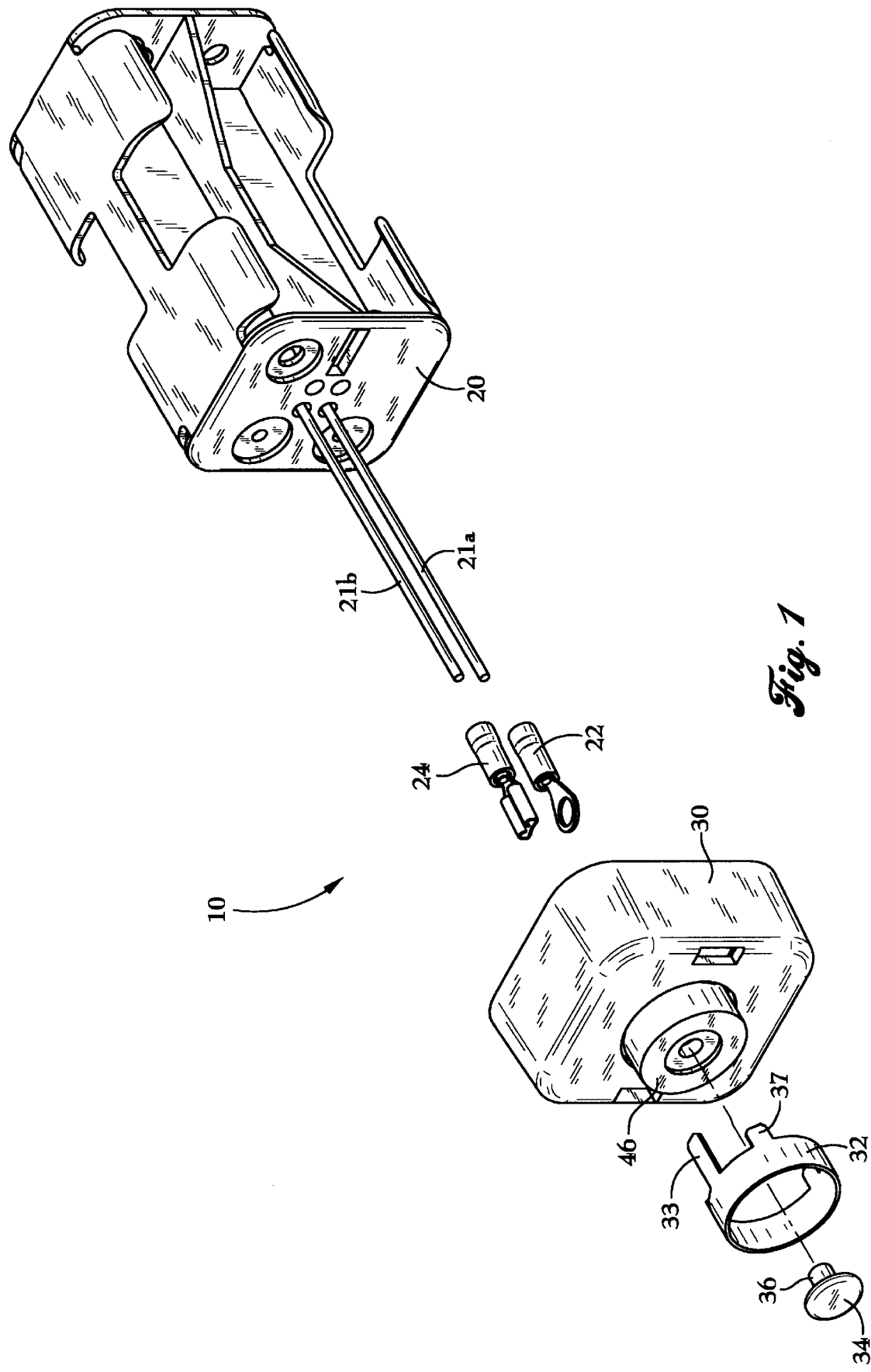
FIG. 1 is an exploded perspective of a first embodiment of the power feed adapter of the present invention.
Figure 2:
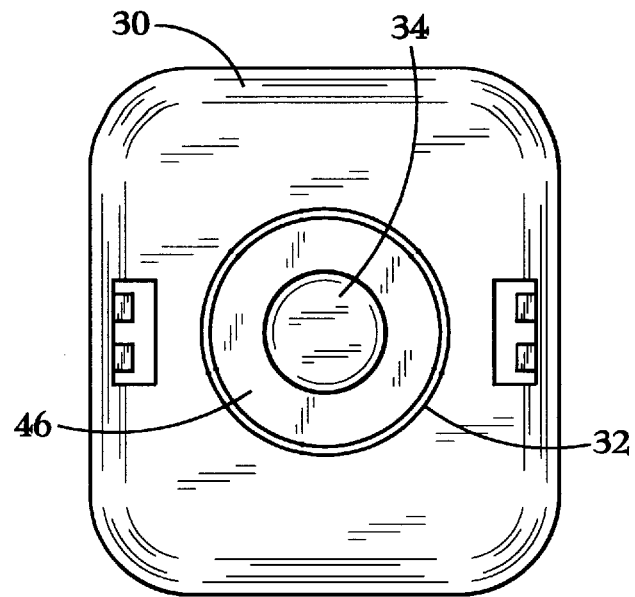
FIG. 2 is a front view of the power feed adapter shown in FIG. 1.
Figure 3:
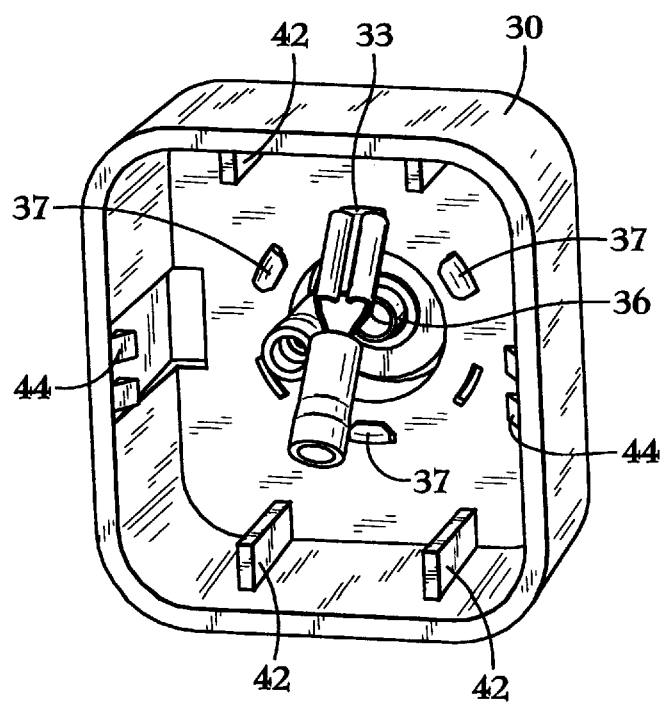
FIG. 3 is a rear view of the power feed adapter cap shown in FIG. 1.

FIGS. 1 through 3 show a first embodiment of a power feed adapter 10. The power feed adapter 10 comprises a battery holder 20 with a plurality of compartments for holding batteries (not shown) connected to a cap 30. The outward surface of the cap 30 includes an insulating ring 46, which is preferably monolithic with the cap 30. Located within the insulating ring 46 is a central contact 34 that has a post 36 extending through the cap 30. Post 36 is attached to terminal 22 by staking, riveting or other electrically conducting means. Terminal 22 is normally attached to the positive power lead wire 21a of the battery holder 20. Surrounding the insulating ring 46 is a ground ring 32. The ground ring 32 has a plurality of attachment tabs 37 and one ground tab 33 extending therefrom. The tabs 37, 33 extend through corresponding slots (not numbered) in cap 30. The attachment tabs 37 are bent over to attach the ground ring to the cap 30. The ground tab 33 is bent at an angle, as shown in FIG. 3, for attachment to a ground ring terminal 24. Ground ring terminal 24 is normally attached to the negative power lead wire 21b of the battery holder 20.

One type of battery holder 20 that can be used is part no. BH24AAW by Memory Protection Devices, Farmingdale, N.Y. The battery holder 20 uses 4 alkaline size AA batteries.

As shown in FIG. 3, the inside of cap 30 includes a plurality of gripping fingers 44, which, when the battery holder 20 is inserted into cap 30, grip the battery holder 20 to hold the battery holder 20 and cap 30 together. The inside of cap 30 also has a plurality of ribs 42, which act as stops on the battery holder 20 to limit how far the battery holder 20 can be inserted into cap 30.

In the event that the internal or on-board battery powering an electronic lock, such as the one shown in FIG. 5, becomes total depleted, the power feed adapter 10 is pressed against the target contact 70 where the power feed adapter central contact 34 contacts the lock central contact 74 and the power feed adapter ground ring 32 contacts the lock ground ring 72, thereby completing power circuit between the batteries and the electronic lock. This feeds power to the electronic lock to permit the lock to be unlocked providing access to the on-board battery for replacement.

A second embodiment of the power feed adapter 10' is shown in FIG. 5. A plastic, insulating housing or cap 30' is designed to fit over the end of an external battery 30a. The housing 30' is keyed to allow only one orientation when being fitted over the end of the battery 30a, thereby maintaining proper electrical polarity. The housing 30' has integral gripping flanges that hold the housing 30' on the end of the battery 30a. A negative contact or ground ring 32' is positioned over a boss 39 on the housing 30'. A flexible contact leg 33' is positioned to pass through an aperture in the housing 30' and is spring loaded against the negative terminal of the battery 30a. The negative contact 32' has a formed cup to fit inside the lock ground ring 72. An insulator 46 is positioned inside the negative contact 32' and over the raised boss 39 on the housing 30'. A positive contact stud 34' is inserted through the raised boss with its head toward the insulator 46. A retaining ring 35 is pressed over the shaft of the positive contact stud 34' on the inside of the housing 30'. The positive contact stud 34' flanged head and the retaining ring 35 sandwich the other parts, 46, 32', between them and hold the assembly together. Additionally, the shaft end of the positive contact stud 34' rests against the positive terminal of the battery 30a when the power feed adapter 10' is in use.

When used, the positive contact stud 34' contacts the corresponding central contact 74 on the lock that is the positive side of the target contact 70. The negative contact 32' mates with the negative ground ring 72 of the target contact 70. Power feed is made by simply touching (inserting) the power feed adapter 10' into the contact target 70 with a battery installed into housing 30'.

Having described the invention, what is claimed is:

1. A power feed adapter comprising:

a battery holder;

an adapter cap for attachment to the battery holder, the adapter cap having a single external electrical contact thereon, the electrical contact comprising:

a central contact connected to a positive terminal of the battery holder;

a non-removable insulating ring surrounding the central contact; and a ground ring surrounding the insulating ring, the ground ring being connected to a negative terminal of the battery holder.

2. The power feed adapter according to claim 1, wherein the battery holder includes at least one battery integral with the battery holder.

3. The power feed adapter according to claim 1, wherein the battery holder includes at least one compartment for removably holding a battery.

4. The power feed adapter according to claim 1, wherein the insulating ring is a monolithic projection on the adapter cap.

5. The power feed adapter according to claim 1, wherein the adapter cap is a four-sided housing having one closed end and one open end.

6. The power feed adapter according to claim 5, wherein an end of the battery holder is inserted into the open end of the four-sided housing.

7. The power feed adapter according to claim 6, wherein the four-sided housing has a plurality of fingers for gripping the battery holder.

8. The power feed adapter according to claim 6, wherein the four-sided housing has a plurality of ribs for limiting the insertion of the battery holder into the four-sided housing.

9. A power feed adapter comprising:

a battery holder;

an adapter cap for attachment to the battery holder, the adapter cap being a housing having one closed end and one open end wherein an end of the battery holder is inserted into the open end of the housing, the housing having a plurality of fingers for gripping the battery holder and a plurality of ribs for limiting the insertion of the battery holder into the housing, the housing having an electrical contact thereon, the electrical contact comprising:

a central contact connected to a positive terminal of the battery holder;

an insulating ring surrounding the central contact; and a ground ring surrounding the insulating ring, the ground ring being connected to a negative terminal of the battery holder.

* * * * *